No. 705,839. Patented July 29, 1902.
A. E. HENDERSON.
THRUST BEARING.
(Application filed Apr. 5, 1902.)
(No Model.)

Witnesses
H. S. Guest
H. Gearing.

Inventor
A. E. Henderson
by C. H. Riches
his Attorney

UNITED STATES PATENT OFFICE.

ALBERT E. HENDERSON, OF TORONTO, CANADA.

THRUST-BEARING.

SPECIFICATION forming part of Letters Patent No. 705,839, dated July 29, 1902.

Application filed April 5, 1902. Serial No. 101,444. (No model.)

*To all whom it may concern:*

Be it known that I, ALBERT ENNIS HENDERSON, of the city of Toronto, in the county of York and Province of Ontario, Canada, have invented certain new and useful Improvements in Thrust-Bearings, of which the following is a full, clear, and exact description.

This invention relates to an antifriction device which will check the longitudinal or end movement of the shaft or journal-box and relieve them of what is technically known as "end thrust," the object of the invention being to so arrange this device that it can be adjusted to take up the end thrust and eliminate the friction of the contacting parts and form an antifriction end bearing therefor.

In carrying out the invention I primarily employ two contacting antifriction thrust-balls, one centrally located in the end of the shaft and the other adjusted to it by a screw passing through the end cap or plate of the journal-box. This construction without further parts is practicable where the journal-boxes and the thrust-balls are required to receive the outward thrust only of the shaft; but where the journal-box is rotatable and is subject to lateral movement under heavy pressure, as in case of vehicle-wheels, it is necessary to provide for the thrust of the journal-box as well as for the thrust of the shaft, which is accomplished by fitting the journal with a radial flange opposed to an annular flange integrally formed with or connected to the inner face of the journal-box and interposing between these flanges auxiliary thrust-balls, as hereinafter more fully set forth, and more particularly pointed out in the claims.

Figure 1:
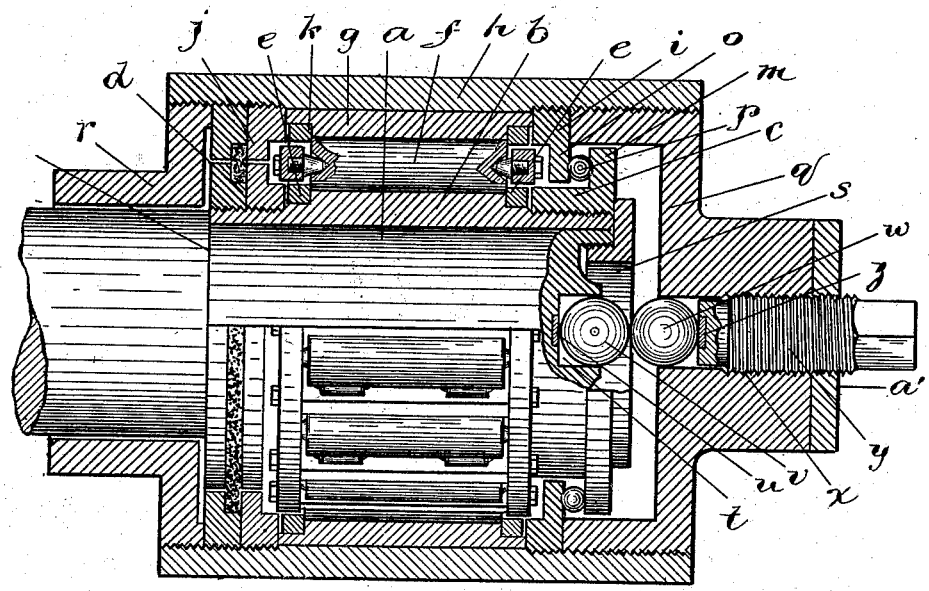
Figure 2:
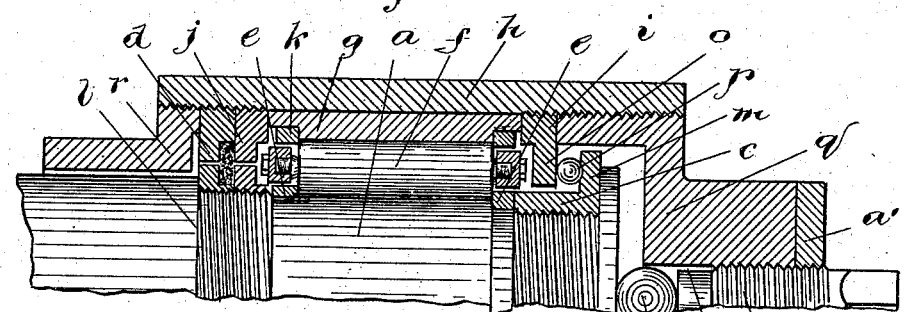
Figure 3:
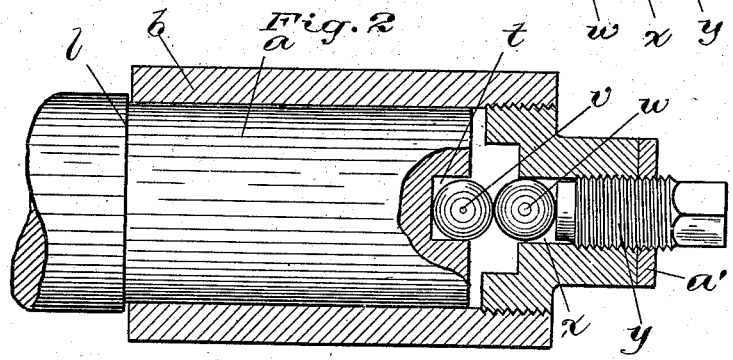

In the drawings, Figure 1 is a sectional view of a journal with its bearing-rollers and journal-box, showing the relative positions of the various parts and the construction and arrangement of the thrust-balls and adjusting-screw. Fig. 2 is a sectional view of a modification of the same. Fig. 3 is a sectional view of a second modification of the same.

Like letters of reference refer to like parts throughout the specification and drawings.

For illustrative and explanatory purposes I have shown and described the thrust-bearing as applicable to a journal and journal-box having antifriction roller-bearings, as well as to ordinary styles of journal-boxes and journals. As the thrust-bearing can be used in connection with any style of journal— such as shafting, vehicle and car axles, propeller-shafts, &c.—I wish it to be understood that the term "journal" includes in its meaning shafts, axles, and axle-arms of all descriptions and that the word "journal-box" includes in its meaning all forms of journal-boxes and wheel-hubs.

Loosely mounted on the end of the journal $a$ is a sleeve $b$, the outer and inner ends of which are screw-threaded to receive the adjusting-nuts $c$ and $d$, respectively. Loosely encircling the journal $a$ between the adjusting-nuts $c$ and $d$ are the retaining-rings $e$ for the antifriction-bearing rollers $f$, and inclosing the antifriction-bearing rollers $f$ and retaining-rings $e$ is a sleeve $g$, fitted into or forming part of the journal-box $h$. The ends of the inner face of the journal-box are screw-threaded to receive the adjusting-nuts $i$ and $j$, respectively, bearing against the outer and inner ends of the sleeve $g$. The internal face of the sleeve $g$ and the external face of the sleeve $b$ are fitted with independently-rotatable abutting shoulders $k$ to partially overlap and engage the ends of the bearing-rollers $f$ and prevent the lateral displacement of the same on the journal $a$. The adjusting-nut $c$ has a radial flange $m$ opposed to the annular flange $o$ of the adjusting-nut $i$, and interposed between the radial and annular flanges $m$ and $o$ are auxiliary thrust-balls $p$ to receive the thrust of the outward movement of the journal-box $h$ or the inward movement of the journal $a$.

Fitted into the outer end of the journal-box $h$ is an end plate or cap $q$, abutting against the adjusting-nut $i$, and fitted into the inner end of the journal-box $h$ is a lock-nut $r$, abutting against the adjusting-nut $j$, the purpose of the end plate or cap $q$ and lock-nut $r$ being to lock the adjusting-nuts rigidly in their adjusted position. The outer end of the journal $a$ is fitted with a lock-nut $s$, which engages the outer end of the sleeve $b$ and the outer face of the adjusting-nut $c$ to lock the sleeve and adjusting-nut $c$ against outward displacement, the inward displacement of the sleeve $b$ being prevented by the shoulder $l$.

Formed centrally in the outer end of the journal $a$ is a recess $t$, having a cushioning-washer $u$, and contained in the recess $t$ is a thrust-ball $v$. Centrally located in the end cap or plate $q$ is a bore directly opposed to the recess in the end of the journal. The outer end of the bore $x$ is screw-threaded to receive the adjusting-screw $y$, the inner end of the adjusting-screw being fitted with a cushioning-washer $z$ to bear against the thrust-ball $w$, which is contained in the inner end of the bore $x$. By means of the adjusting-screw $y$ the thrust-ball $w$ can be minutely adjusted to the thrust-ball $v$ to receive the end bearing of the journal and prevent the end movement of the journal and journal-box without interfering with the free revolution of the same, the adjusting-screw $y$ being locked in its adjusted position by a lock-nut $a'$, bearing against the outer face of the end cap or plate $q$. The antifriction-balls $v$ and $w$ receive the thrust of the outward movement of the axle or the inward movement of the journal-box, while the auxiliary thrust-balls $p$ receive the inward thrust of the axle or outward thrust of the journal-box, the thrust of either the journal or journal-box under heavy pressure or otherwise being cushioned by the washers $u$ and $t$.

Having thus fully described my invention, what I claim as new, and desire to secure by Letters Patent, is—

1. In a thrust-bearing the combination of the journal the journal-box, antifriction thrust-balls interposed between the end of the journal and journal-box, a peripheral flange for the journal, an annular flange for the journal-box opposed to the peripheral flange, and auxiliary thrust-balls interposed between the annular and peripheral flanges, substantially as specified.

2. In a thrust-bearing the combination of the journal, having in its end a centrally-located ball-chamber, a journal-box having an end cap fitted with a longitudinal bore registering with the ball-chamber of the journal, contacting thrust-balls contained in the ball-chamber and bore respectively, and an adjusting-screw fitted into the bore to adjust the thrust-balls to each other, substantially as specified.

3. In a thrust-bearing the combination of the journal, having in its end a centrally-located ball-chamber, a journal-box having an end cap fitted with a longitudinal bore registering with the ball-chamber of the journal, contacting thrust-balls contained in the ball-chamber and bore respectively, an adjusting-screw fitted into the bore to adjust the thrust-balls to each other, and resilient cushions contacting the balls in the ball-chamber and adjusting-screw, substantially as specified.

4. In a thrust-bearing the combination of the journal, having in its end a centrally-located ball-chamber, a journal-box having an end cap fitted with a longitudinal bore registering with the ball-chamber of the journal, contacting thrust-balls contained in the ball-chamber and bore respectively, an adjusting-screw fitted into the bore to adjust the thrust-balls to each other, resilient cushions in the ball-chamber and adjusting-screw and contacting the balls, a radial flange for the journal opposed to an annular flange for the journal-box and auxiliary thrust-balls interposed between the annular and radial flanges, substantially as specified.

5. In a thrust-bearing, the combination of a journal having a recess in its outer end, said recess having a greater diameter than depth, a journal-plate opposed to the end of the journal provided with a bore in alinement with said recess, an adjustable screw mounted in said bore to provide a recess in the inner end of the plate of lesser depth than the diameter of the bore, and balls mounted in the recesses projecting respectively beyond the outer faces of the journal and the journal-plate, said balls contacting to receive the end thrust.

Toronto, March 20, 1902.

A. E. HENDERSON.

In presence of—
C. H. RICHES,
L. F. BROCK.